G. J. E. SUNDBERG & C. J. J. HAGG.
MILKING MACHINE.
APPLICATION FILED MAR. 26, 1908.
917,905.
Patented Apr. 13, 1909.
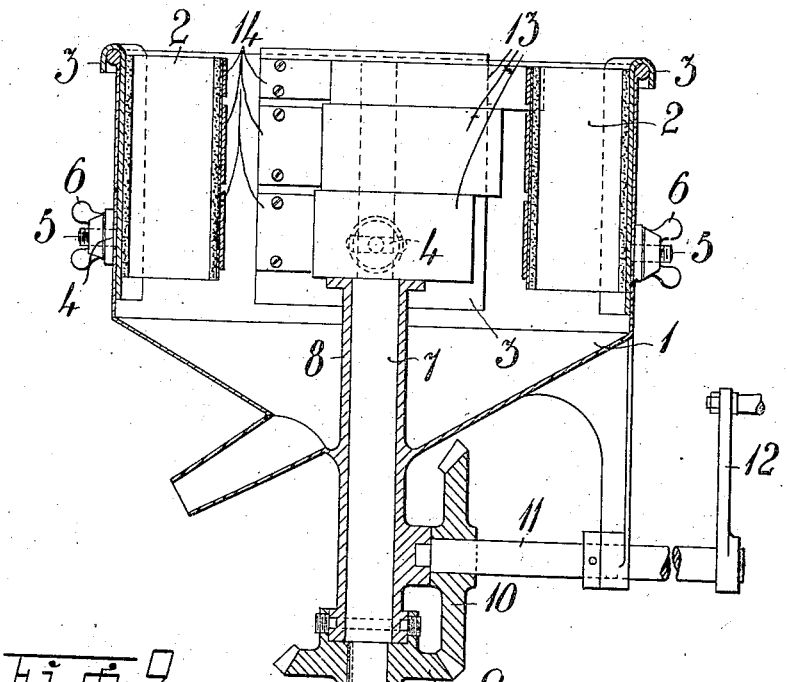
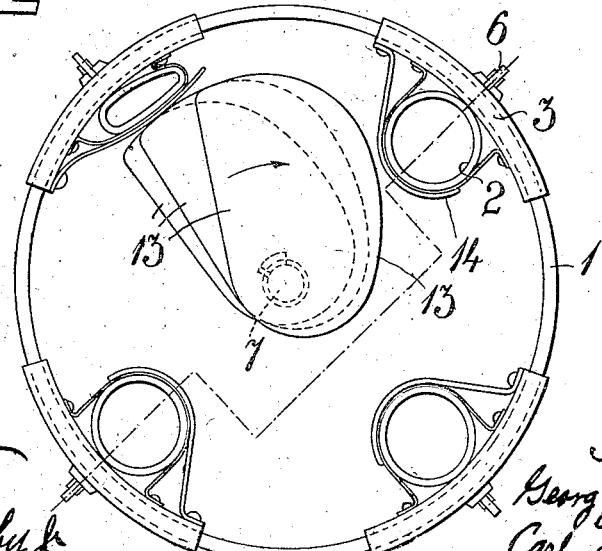
Witnesses
J. J. Sheehy Jr.
N. C. Healy
Inventors
Georg J. E. Sundberg
Carl J. J. Hägg
by James J. Sheehy
Attorney ered by a casing, of teat-cups mounted in said

UNITED STATES PATENT OFFICE.

GEORG JOHAN EUGEN SUNDBERG, OF STOCKHOLM, AND CARL JAKOB JOHAN HÄGG, OF HAGARYD, SWEDEN.

MILKING-MACHINE.

No. 917,905.      Specification of Letters Patent.      Patented April 13, 1909.

Application filed March 26, 1908. Serial No. 423,441.

*To all whom it may concern:*

Be it known that we, GEORG JOHAN EUGEN SUNDBERG and CARL JAKOB JOHAN HÄGG, subjects of the King of Sweden, and residents of Stockholm and Hagaryd, Sweden, respectively, have invented new and useful Improvements in Milking-Machines, of which the following is a specification, reference being had to the accompanying drawing, which forms a part of this specification.

This invention relates to a milking machine in which the teats in the same manner as in several well known milking machines, where the teats are actuated by reciprocating pistons, or the like, are successively pressed together from the root to the point.

The object of the invention is to provide a machine of said kind which will be of a very simple and cheap construction but nevertheless reliable and effective in its function.

The invention consists, chiefly, in that the machine, which in well known manner is provided with a number of teat-cups, has a number of cam-disks arranged the one above the other on a common shaft centrally in relation to the said teat-cups and acting when being rotated directly on the latter or on protection-pieces placed in front of the teat-cups, the said cam-disks being so displaced in relation to each other that each teat-cup is first actuated by the uppermost cam-disk and then by the next lower one and so on. Further the cam-disks are of such shape that they release the teat-cups in order commencing at the top and preferably in such a manner that one cam-disk does not release a teat-cup until the next lower one has fully engaged the same teat-cup.

In the accompanying drawing we have shown a construction form of our invention.

Figure 1 shows a vertical section, partly in elevation, and Fig. 2 shows a plan-view of the machine.

Referring to the drawing, 1 represents a casing of metal-sheet, or the like, in which are provided teat-cups 2 of elastic material, such as india rubber. The teat-cups are preferably displaceable peripherically in order that the distance between them may be varied in accordance with the different distances between the teats of the cows. For the said purpose the teat-cups are secured to sliding pieces 3 arranged on the inner side of the casing 1 and having screw-threaded pins 5 extending through slots 4 in the wall of the casing, the said pins 5 being provided with nuts 6 by means of which the sliding-pieces may be clamped against the wall of the casing and thereby the teat-cups fixed in the desired position.

Centrally in the casing 1 is provided a rotatable shaft 7 journaled in a bearing 8 at the bottom of the casing 1 and having on its lower end a bevel-wheel 9 engaging a bevel-wheel 10 on a shaft 11 provided with a crank 12 by means of which the said shaft 7 can be rotated. For the said driving-device obviously any other suitable driving-device may be substituted. The shaft 7 supports a number of cam-disks 13, for instance three, as is shown, which during the rotation of the shaft 7 act directly on the teat-cups 2 or preferably on protection-pieces 14 in front of the teat-cups. The said protection-pieces may consist for instance of spring-plates. The cam-disks are, as is shown in Fig. 2, so displaced in relation to each other that each teat-cup will at first be actuated by the uppermost cam-disk and then by the next lower one and so on. The cam-disks release the teat-cups in order commencing from the top but in such a manner that one cam-disk does not release the teat-cup until the next lower one has fully engaged the same teat-cup.

As is shown in Fig. 2 at least one teat-cup is always pressed together by the cam-disks. This is of course a great inconvenience in applying the machine to the teats and for obviating the same only the uppermost cam-disk should be rigidly secured to the shaft 7 while the other disks should be rotatable on the shaft within certain limits so that they can be turned into a position in which they are fully covered by the uppermost cam-disk. By this means it will be possible to bring all the cam-disks into such a position that no teat-cup is engaged by the cam-disks, provided that their cams are of less extension in peripherical direction than the distance between two adjacent teat-cups.

Having now described our invention, what we claim as new and desire to secure by Letters Patent is:

1. In a milking machine, the combination with a plurality of rotary cams arranged one above the other, means for rotating said cams, and a plurality of vertically disposed, compressible teat-cups supported about the cams and arranged to be engaged and compressed by the same.

2. A milking machine comprising a casing, vertical-central shaft therein, sliding pieces arranged on and adjustably fixed to the casing, compressible teat cups carried by said pieces and arranged vertically in the casing, cams mounted one above the other on the shaft, and protection pieces attached to the sliding pieces and arranged at the inner sides of the teat-cups for the engagement of the cams.

In testimony that we claim the foregoing as our invention, we have signed our names in presence of two subscribing witnesses.

GEORG JOHAN EUGEN SUNDBERG.
CARL JAKOB JOHAN HÄGG.

Witnesses:
 EWALD DELMAR,
 JOHN DELMAR.